United States Patent [19]
Frank

[11] Patent Number: 5,806,550
[45] Date of Patent: Sep. 15, 1998

[54] METHOD AND APPARATUS FOR MONITORING AND CONTROLLING THE AMOUNT OF LIQUID IN A MIXING CHAMBER

[76] Inventor: Jimmy I. Frank, 17 Woodsborough, Houston, Tex. 77055

[21] Appl. No.: 773,074

[22] Filed: Dec. 26, 1996

Related U.S. Application Data

[63] Continuation-in-part of Ser. No. 536,991, Sep. 29, 1995, Pat. No. 5,706,661.

[51] Int. Cl.⁶ .............................. F02M 23/08; F17D 1/00
[52] U.S. Cl. ................................. 137/7; 62/171; 261/134
[58] Field of Search ..................... 62/179, 171; 261/134; 137/7, 12, 5

[56] References Cited

U.S. PATENT DOCUMENTS

| | | | |
|---|---|---|---|
| 4,187,262 | 2/1980 | Fessler et al. | 261/50 |
| 4,747,272 | 5/1988 | Howell et al. | 62/136 |
| 4,827,965 | 5/1989 | Wates | 137/88 |
| 4,972,883 | 11/1990 | Hassell et al. | 141/1 |
| 5,425,461 | 6/1995 | Larson | 211/88 |
| 5,518,666 | 5/1996 | Plester et al. | 261/39.1 |

Primary Examiner—William E. Wayner
Attorney, Agent, or Firm—Arnold, White & Durkee

[57] ABSTRACT

A method and apparatus are disclosed for improving the consistency and quality of a frozen carbonated beverage product. The invention utilizes a method of monitoring the level of liquid in the mixing chamber of a frozen carbonated beverage machine to accomplish this result. The method involves measuring the pressure spikes that occur in the mixing chamber. The magnitude of a pressure spike is indicative of the amount of liquid in the mixing chamber. If a pressure spike is too high or too low, that is indicative that there is too much or too little liquid in the mixing chamber. By regulating the amount of liquid in the chamber, the consistency and quality of the beverage product can be maintained. The present invention uses a microprocessor to determine when the spikes are outside of an acceptable predetermined range. If the pressure spikes are outside of the acceptable range, the microprocessor readjusts set point pressure values, which are used to determine when to turn on and off the supply of ingredients into the chamber, thereby regulating the gas to liquid ratio, and thus the amount of liquid in the chamber. This in turn allows for accurate control over the consistency and quality of the beverage product.

25 Claims, 9 Drawing Sheets

METHOD AND APPARATUS FOR MONITORING AND CONTROLLING THE AMOUNT OF LIQUID IN A MIXING CHAMBER

CROSS-REFERENCE TO RELATED APPLICATION

This application is a continuation-in-part of application Ser. No. 08/536,991 filed on Sep. 29, 1995, now U.S. Pat. No. 5,706,661.

FIELD OF THE INVENTION

The present invention relates generally to beverage machines, and more particularly to a method and apparatus for monitoring and controlling the amount of liquid in the mixing chamber of frozen carbonated beverage machine so as to control the consistency and quality of the dispensed beverage product.

BACKGROUND OF THE INVENTION

Frozen carbonated beverage machines are known in the art and have been used for years. These devices produce a frozen carbonated beverage by freezing a mixture of ingredients including syrup, water and carbon dioxide in a mixing chamber. The mixture freezes on the inner surface of the mixing chamber which is surrounded by a helical coil through which a refrigerant passes. A rotating shaft is disposed inside the chamber which has a plurality of outwardly projecting blades that scrape the mixture off the inside wall of the mixing chamber. Once the carbonated beverage is in the desired frozen state, the product is dispensed from the chamber through a product valve.

The temperature and viscosity of the ingredients within the mixing chamber are maintained by a control system that controls the refrigeration system. The control system also controls the amount of the ingredients injected into the mixing chamber so as to maintain the quantity of such ingredients within the chamber at a prescribed amount. Such control systems typically include a pressure responsive device that controls the amount of ingredients fed into the chamber in response to chamber pressure.

The pressure of the carbon dioxide within the chamber is maintained above atmospheric pressure, and the temperature of the liquid within the chamber is maintained below the freezing point of water at atmospheric pressure, but above the temperature where the liquid readily freezes at the pressure within the chamber. The viscosity of the liquid must also be maintained within prescribed limits. Under these conditions of temperature and pressure and with the viscosity suitably maintained, the beverage is dispensed from the chamber through the product valve to atmospheric pressure, in a semi-frozen state similar to frozen foam.

The volume of the product dispensed from the mixing chamber is defined as "overrun." A liquid that doubles its volume when it is dispensed from the mixing chamber in a semi-frozen state is defined as having an overrun of 100%. Typically, the more carbon dioxide that is added to the mixing chamber, the higher the overrun. From a quality standpoint, it is desirable to be able to control overrun so that the consistency of the product can be maintained.

The quality of the product is also determined by the ratio of the mixture of the syrup, water, and carbon dioxide content. The ability to control and adjust this mixture is a function of the ability to accurately monitor and control pressures, temperatures, and carbon dioxide content. While other factors such as syrup content also affect the quality of the product, the amount of carbonation is the primary factor. A major drawback of known frozen carbonated beverage machines is their inability to maintain proper control over the pressures, temperatures, and the carbon dioxide content entering the mixing chamber, so as to produce a consistently high quality product.

Another drawback with known frozen carbonated beverage machines is their inability to effectively control the consistency of the product no matter what the "draw rate" of the machine is, i.e., no matter how much or how little product is being drawn from the machine during a given time period. At high draw rates, the drink tends to get over carbonated, and at low draw rates, not enough carbon dioxide is added to the mixture. Factors such as inconsistent operation of the mechanisms that control the gas to liquid ratio, e.g., the pressure regulator and the solenoids, as well as pressure drops in the flow conduit can contribute to this problem. Known machines have not been able to correct this problem, in large part because they have not been able to monitor and thus control the amount of liquid in the mixing chamber.

It has been long recognized that in order to produce a frozen carbonated drink of optimum quality, regardless of the draw rate, the liquid level has to be precisely controlled. However, before the liquid level can be controlled it must be ascertained, which until now has not been possible. The problem with monitoring the liquid level in the mixing chamber has been that it cannot be seen due to the foaming effect of the carbon dioxide and frozen liquid continuously being mixed in the chamber. For example, even when the chamber is half empty and the tank is frozen, the chamber appears fill. The only time the level can be detected in known devices is when the chamber is defrosted.

Another problem with existing machines is that if a drink is drawn from the machine while the product is defrosted and in the liquid state, or during its initial freeze down when the product is in a partially liquid state, many machines will not refill the chamber. This upsets the liquid to gas ratio in the chamber to the point that in many cases a service call will be required to correct the balance. This is typically done by manually adding liquid to the chamber. If this is not done, the product quality will deteriorate to the point that the product is simply not acceptable.

The present invention is directed to an improved beverage machine that overcomes, or at least minimizes, some of these problems.

SUMMARY OF THE INVENTION

The present invention is directed to a method and apparatus for improving the consistency and quality of a frozen carbonated beverage product. The invention utilizes a method of monitoring the level of liquid in the mixing chamber of a beverage machine to accomplish this result. In one aspect of the invention, the pressure inside the mixing chamber is monitored during a fill cycle, i.e., when the ingredients are being injected into the mixing chamber. Very often a pressure spike occurs immediately following a fill cycle. This pressure spike is measured. The magnitude of the pressure spike is indicative of the amount of liquid in the chamber. If there is too much gas in the chamber and not enough liquid, then a small pressure spike will occur. On the other hand, if there is not enough gas in the chamber and too much liquid, then a large pressure spike will occur. By regulating the amount of gas and liquid being injected into the mixing chamber, i.e., the gas to liquid ratio, the magnitude of the pressure spike that occurs following a fill cycle can be maintained within an acceptable range, and thus the amount of liquid in the mixing chamber can be regulated. This enables the consistency and quality of the product to be accurately controlled.

In accordance with another aspect of the invention, the pressure in the mixing chamber is monitored during a draw cycle, i.e., when product is being dispensed from the mixing chamber. Like with a fill cycle, very often either during or immediately after a draw cycle, the pressure in the chamber suddenly changes. If there is too much liquid in the chamber and not enough gas, the pressure suddenly falls by a significant amount, ie., a large negative spike occurs. On the other hand, if there is not enough liquid in the chamber and too much gas, then there is very little change in the pressure in the mixing chamber, i.e., no spike or a very small negative spike occurs. By regulating the gas to liquid ratio, the magnitude of the pressure drop that occurs during or following a draw cycle can be controlled within an acceptable range, and thus the consistency and quality of the product can also be accurately controlled.

In one method according to the present invention, low and high set point pressure values are selected. The low set point pressure value is the pressure at which the ingredients are injected into the mixing chamber and the high set point pressure value is the pressure at which the supply of ingredients to the mixing chamber is reduced or shut off. These set point pressure values correspond to pressures measured in the mixing chamber and are dependent upon the pressure at which the gas is supplied to the mixing chamber. They are preferably set at some offset value below the gas supply pressure. The low set point pressure value is preferably set at between 3 and 7 psi (lbs/in$^2$) below the gas supply pressure, and the high set point pressure value is preferably set at between 1 and 5 psi below the gas supply pressure.

In one aspect of this method, the pressure spike that results following a fill cycle is measured. If the pressure spike is outside of a predetermined acceptable range, then the set point pressure values are readjusted. The set point pressure values are readjusted to values lower than those previously selected when the pressure in the mixing chamber is above the acceptable predetermined range, and readjusted to values higher than those previously selected when the pressure in the mixing chamber is below the predetermined acceptable range. The pressure spike is preferably between 3 and 7 psi in magnitude when the low set point pressure value is 25 psi and the high set point pressure value is 27 psi, i.e., the pressure is within the acceptable range in this case if it increases to a value between 30 and 34 psi. It should be recognized that the magnitude of the acceptable pressure spike may vary depending upon what the low and high set point pressure values are set at.

Typically, the pressure spike will occur anytime after the dispensing valve opens until 3 seconds after the dispensing valve closes. The pressure in the mixing chamber is continuously measured during this time period. In the preferred embodiment of the present invention, the pressure in the chamber is continuously measured, approximately every 0.33 seconds.

In another aspect of this method, the pressure in the mixing chamber is measured during a draw cycle. If during such a draw cycle the pressure in the mixing chamber changes by more than an acceptable amount, then the set point pressure values are readjusted. The set point pressure values are readjusted to values lower than those previously selected when the pressure in the chamber falls too much, and readjusted to values higher than those previously selected when the pressure in the mixing chamber does not fall enough. Preferably, the pressure in the chamber during a draw cycle falls between 2 and 10 psi when the low set point pressure value is 25 psi and the high set point pressure value is 27 psi. If the pressure should fall more or less than this amount then the offset values need to be changed. Typically, a negative pressure spike will occur for a period of between 0 and 2 seconds. The pressure in the mixing chamber is continuously measured during this period.

In one embodiment of the present invention, the apparatus for controlling the quality of a frozen carbonated beverage product according to the present invention includes a transducer, a programmable memory device, pressure control valves, and a microprocessor. The transducer measures the pressure of the frozen carbonated beverage product in the mixing chamber. The programmable memory device employs an algorithm that selects a low set point pressure value and a high set point pressure value that are dependent upon the pressure of gas being injected into the mixing chamber. The control valves regulate the supply of ingredients into the mixing chamber in response to instructions received from the microprocessor, which is electrically connected to the transducer, programmable memory device, and control valves and controls the injection of the ingredients into the mixing chamber. The microprocessor is operative to monitor the pressure of the frozen carbonated beverage product in the mixing chamber during a fill cycle and readjust one or both of the set point pressure values if the pressure spike that occurs immediately following the fill cycle is outside of a predetermined acceptable range.

In another embodiment of the apparatus according to the present invention, the microprocessor is operative to monitor the pressure in the mixing chamber during a draw cycle and readjust one or both of the set point pressure values if the pressure drop that occurs in the mixing chamber during, or immediately following, the draw cycle is outside of a predetermined acceptable range.

The method and apparatus just described has broader application than in the frozen carbonated beverage industry. The principle disclosed herein has application in the production of any beverage product, whether or not it is carbonated and whether or not it is frozen. In such applications, the offset values and hence low and high set point pressure values would be preferably set to values known in the industry to initially produce a product of high quality. The method and apparatus according to the present invention would insure that the quality of that product would be accurately maintained.

In an alternate method according to the present invention, the gas to liquid ratio is adjusted by injecting more (or less) gas or liquid into the chamber, when a pressure spike, either positive or negative, occurs. For example, if the pressure increases above a predetermined range or decreases below a predetermined range, then more gas would be injected into the mixing chamber. This may be accomplished by either adding only gas to the mixing chamber to the exclusion of the liquid, or by adding a greater volume of gas per unit volume of liquid. If the pressure in the mixing chamber increases below the predetermined range or decreases above the predetermined range, then more liquid would be added to the mixing chamber. This would also be accomplished by adding either only liquid to the mixing chamber to the exclusion of the gas, or by adding a greater volume of liquid per unit volume of gas.

The amount of gas or liquid that needs to be added to the mixing chamber in accordance with the alternate method depends upon the magnitude of the pressure spike. This is a direct relationship, e.g., the larger the pressure spike is, either positive or negative, the more gas that needs to be added to the mixing chamber. Similarly, the smaller the pressure spike is, either positive or negative, the more liquid that needs to be added to the mixing chamber. Empirical studies can be conducted to optimize this relationship. A control algorithm, stored in the programmable memory device, is preferably employed in determining exactly how much gas or liquid needs to be added to the mixing chamber for a given pressure spike. The microprocessor according to the present invention would also be implemented in carrying out this alternate technique.

BRIEF DESCRIPTION OF THE DRAWINGS

Other aspects and advantages of the present invention will become apparent upon reading the following detailed description and upon reference to the drawings in which.

DETAILED DESCRIPTION OF THE INVENTION

Figure 1:
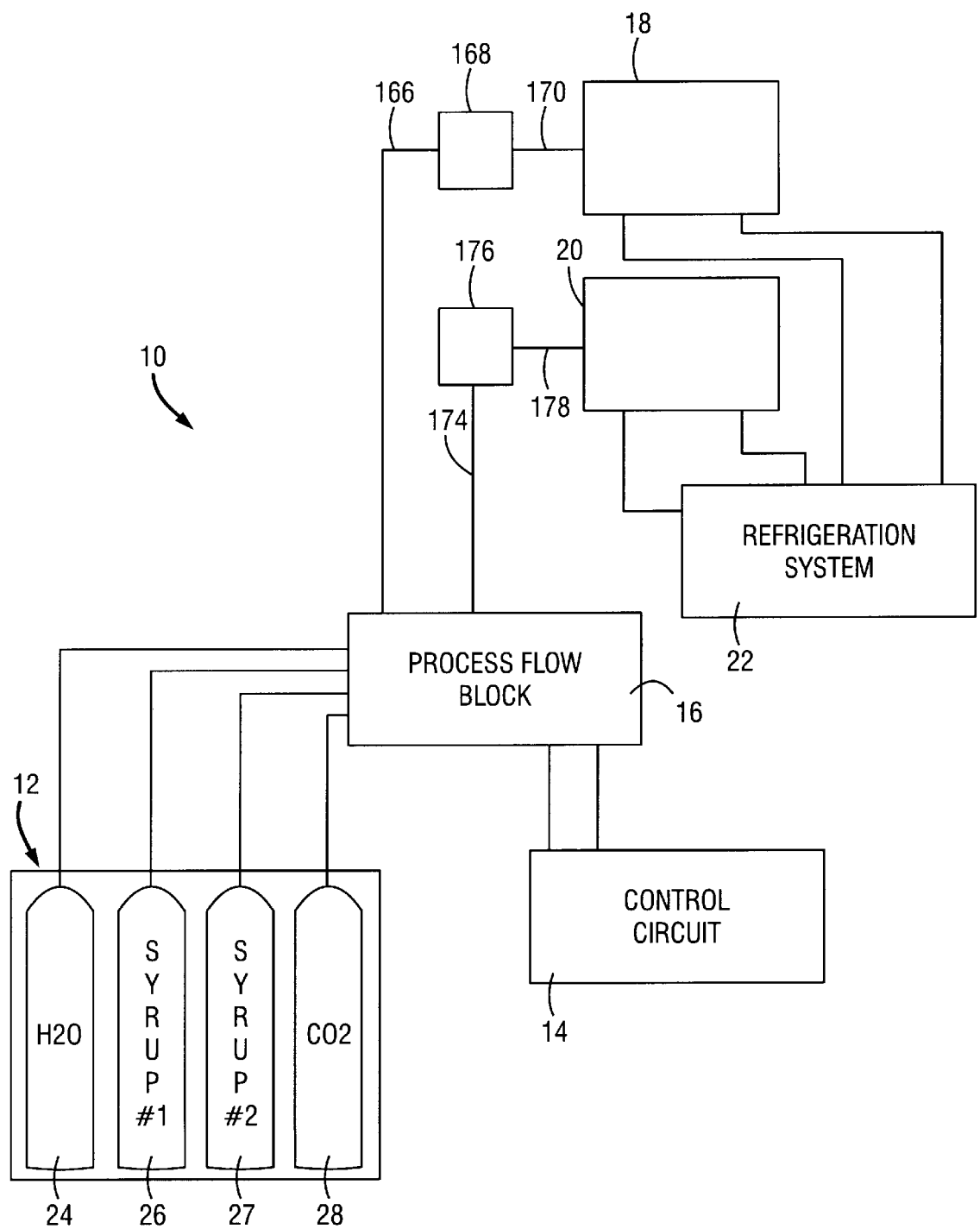
FIG. 1 is a schematic diagram of the basic components of the frozen carbonated beverage machine according to the present invention.

Turning now to the drawings and referring initially to FIG. 1, a system diagram of a frozen carbonated beverage machine according to the present invention is shown generally by reference numeral 10. The system 10 includes an ingredient supply source 12, a control circuit 14, a process flow block 16, a pair of mixing chambers 18 and 20 and a refrigeration system 22. The ingredient supply source 12 includes a water supply tank 24, a pair of syrup supply tanks 26 and 27 (for two different flavors) and a carbon dioxide tank 28.

Figure 2:
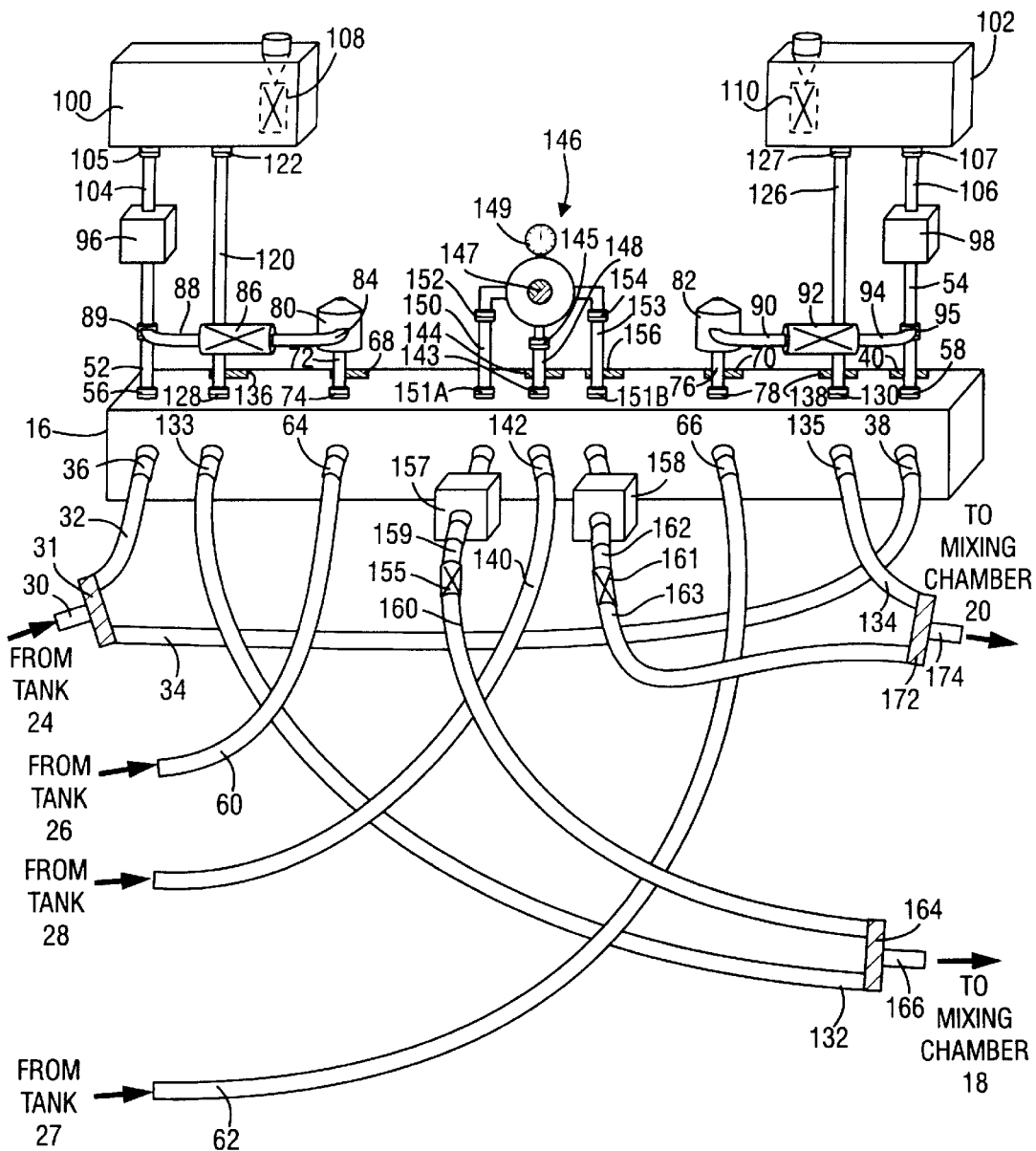
FIG. 2 is a detailed diagram of a process flow block used in accordance with the present invention.

Water is supplied from the water supply tank 24 to the process flow block 16 via a supply hose 30, which via a "T" connector 31 branches off into two separate supply hoses 32 and 34, as shown in FIG. 2. Supply hose 32 feeds into the left side of the process flow block 16, and supply hose 34 feeds into the right side of the process flow block 16. As will be further explained below, the left side of the process flow block 16 controls the flow of the ingredients into the mixing chamber 18 and the right side of the process flow block 16 controls the flow of the ingredients into the mixing chamber 20.

The supply hose 32 is mounted to the process flow block 16 via a coupling 36, which is press-fitted into an inlet formed in the process flow block, as shown in FIG. 2. Similarly, the supply hose 34 is mounted to the process flow block 16 via a coupling 38, which is also press-fitted into an inlet formed in the process flow block. The water exits the process flow block 16 via outlets, which are disposed on an adjacent face of the process flow block at an angle of 90 degrees. A transducer 40 is mounted on the right side of the process flow block 16 to monitor the pressure of the water flowing through the process flow block 16. Since the water is being supplied to the block 16 from the same source, only one transducer is needed. As those of ordinary skill in the art will appreciate, the transducer 40 could alternatively be placed on the left side of the process flow block 16.

Figure 3:
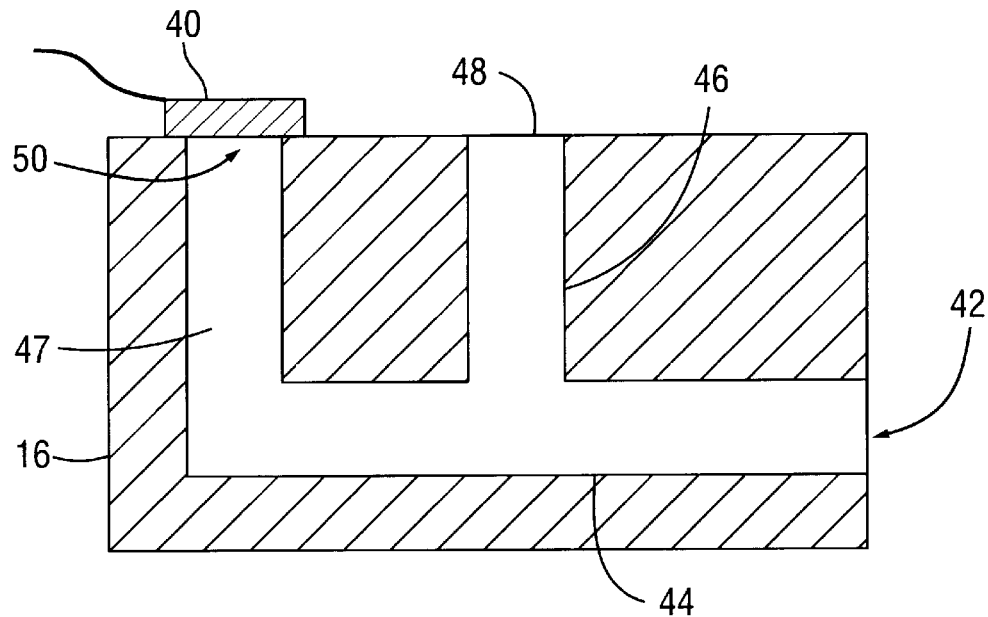
FIG. 3 is a representational flow path showing the flow of one of the ingredients through the process flow block shown in FIG. 2.

The flow of the water through the process flow block 16 can best be seen in FIG. 3. The flow of the water on the right side of the process flow block 16 is illustrated, because as will be seen, this same flow arrangement is used for the flow of the other ingredients through the flow block 16. The water enters the process flow block 16 through an inlet 42. It then travels through flow channel 44 which branches off into flow channels 46 and 47. The water exits the process flow block 16 through an outlet 48 which is disposed at the end of flow channel 46. The flow channel 47 leads to an outlet 50. The transducer 40 is mounted to the process flow block 16 adjacent the outlet 50. This placement of the transducer 40 allows it to read the pressure of the water flowing through the process flow block 16.

Returning to FIG. 2, the water flows out of the process flow block 16 and into tubes 52 and 54. The tube 52 is disposed on the left side of the process flow block 16 and the tube 54 is disposed on the right side of the process flow block. A pair of couplings 56 and 58 connect the tubes 52 and 54, respectively, to the process flow block 16. The couplings 56 and 58 are preferably press-fitted into the block 16.

Syrup No. 1 is supplied from syrup supply tank 26 to the process flow block 16 via a supply hose 60 which feeds into the left side of the process flow block 16. Syrup No. 2 is supplied from syrup supply tank 27 to the process flow block 16 via a supply hose 62 which feeds into the right side of the process flow block. The supply hose 60 is mounted to the process flow block 16 via a coupling 64 which is press-fitted into an inlet formed in the process flow block. Similarly, the supply hose 62 is mounted to the process flow block 16 via a coupling 66 which is also press-fitted into an inlet formed in the process flow block. The syrups exit the process flow block 16 via outlets which are disposed on the adjacent face of the flow block at an angle of 90 degrees. A transducer 68 is mounted on the left side of the process flow block 16 to monitor the pressure of the syrup No. 1 flowing through the process flow block 16 and a transducer 70 is mounted on the right side of the process flow block 16 to monitor the pressure of syrup No. 2 flowing through the process flow block.

As syrup No. 1 exits the process flow block 16 through the outlet it enters a tube 72. The tube 72 is mounted to the process flow block 16 via a coupling 74 which is preferably press-fitted into the process flow block. Similarly, as syrup No. 2 exits the process flow block 16 through the outlet it enters a tube 76. The tube 76 is also mounted to the process flow block 16 via a coupling 78, which is preferably press-fitted into the block.

A pair of brix adjusters 80 and 82 are attached to the tubes 72 and 76, respectively. The brix adjusters 80 and 82 control the amount of syrup that is mixed with the water. These devices are manually adjusted. Since they are well known in the art, they will not be further described herein.

After syrup No. 1 passes through the brix adjuster 80, it passes through a tube 84 to a check valve 86, which prevents the syrup from flowing back into the brix adjuster 80, i. e., it is a one-way directional valve. After syrup No. 1 passes through the check valve 86, it passes through a tube 88, which is coupled to tube 52 via a coupling 89. At the point where tubes 52 and 88 join, the syrup No. 1 mixes with the water being supplied to the left side of the process flow block 16. Similarly, after syrup No. 2 passes through the brix adjuster 82, it passes through a tube 90 to a check valve 92. After syrup No. 2 passes through the check valve 92 it passes through a tube 94, which is coupled to tube 54 via a coupling 95. At the point where tubes 54 and 94 join, the syrup No. 2 mixes with the water being supplied to the right side of the process flow block 16.

A pair of solenoids 96 and 98, which are activated by the control circuit 14, as will be further explained below, control the flow of the syrup/water mixtures into the mixing chambers 18 and 20. The solenoid 96 controls the flow of the syrup No. 1/water mixture into the mixing chamber 18 and the solenoid 98 controls the flow of the syrup No. 2/water mixture into the mixing chamber 20.

When the solenoids 96 and 98 are instructed to open, the syrup/water mixtures flow into secondary flow blocks 100 and 102, via tubes 104 and 106, respectively, which are mounted to the flow blocks 100 and 102 via press-fitted couplings 105 and 107, respectively. It should be understood that each of the solenoids 96 and 98 is independently controlled. Sample valves 108 and 110 are provided at the secondary flow blocks 100 and 102, respectively, for sampling the syrup/water mixtures. The taste of the mixtures can be varied by adjusting the brix adjusters 80 and 82.

Figure 4:
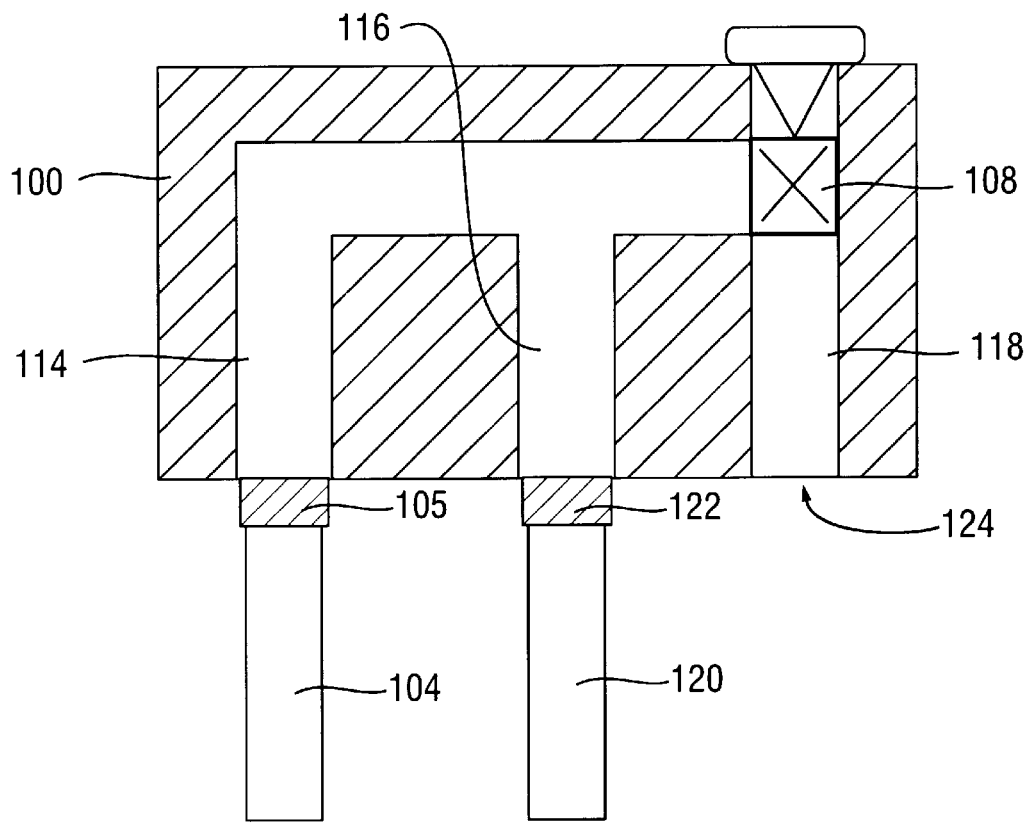
FIG. 4 is a representational flow path showing the flow of a solution containing a mixture of syrup and water through a secondary flow block used in accordance with the present invention.

The flow path of the syrup No. 1/water mixture through the secondary flow block 100 is shown in greater detail in FIG. 4. Since the secondary flow blocks 100 and 102 are identical, only the detail of one of the blocks is illustrated. The syrup No. 1/water mixture enters the secondary flow block 100 via tube 104. Once inside the secondary flow block 100, the syrup No. 1/water mixture flows through a flow channel 114 which branches off into two separate flow channels 116 and 118. Flow channel 116 directs the syrup No. 1/water mixture out of the secondary flow block 100 into a tube 120, which in turn delivers the mixture to the process flow block 16. The tube 120 is coupled to the secondary flow block 100 via coupling 122, which is press-fitted into block 100. Flow channel 118 delivers the mixture out of the secondary flow block 100 into the atmosphere. The mixture exits the secondary flow block 100 through exit port 124. Sample valve 108 is disposed within flow channel 118 and regulates the flow of the mixture out of the secondary flow block 100 into the atmosphere. Preferably, a cup (not shown) is placed beneath the exit port 124 to collect a sample of the mixture when such a sample is desired.

Similarly, a tube 126 connected to the secondary flow block 102 via press-fitted coupling 127 transfers the syrup No. 2 /water mixture from the secondary flow block 102 to the process flow block 16, as shown in FIG. 2. The tubes 120 and 126 are mounted to the process flow block 16 via couplings 128 and 130, respectively, which are press-fitted into inlet ports in the process flow block.

The syrup No. 1/water mixture exits the process flow block 16 through an exit port which is disposed on the face of the process flow block adjacent to the inlet port at an angle of 90 degrees. A hose 132, which is coupled to the process flow block 16 via a press-fitted coupling 133, delivers the syrup No. 1/water mixture from the process flow block to the mixing chamber 18 as further described below.

The syrup No. 2/water mixture also exits the process flow block 16 through an exit port which is disposed on the face of the process flow block adjacent to the inlet port at an angle of 90 degrees. Similarly, a hose 134, which is coupled to the process flow block 16 via a pressfitted coupling 135, delivers the syrup No. 2/water mixture from the process flow block to the mixing chamber 20.

A pair of transducers 136 and 138 are mounted to the process flow block 16 to monitor the respective pressures of the syrup No. 1/water mixture and the syrup No. 2/water mixture flowing through the process flow block.

Carbon dioxide is supplied from the carbon dioxide supply tank 28 to the process flow block 16 via a supply hose 140. The carbon dioxide supply hose 140 feeds into the center of the process flow block 16. The supply hose 140 is mounted to the process flow block 16 via a coupling 142, which is press-fitted into an inlet formed in the process flow block. The carbon dioxide exits the process flow block 16 via an outlet which is disposed on the adjacent face of the flow block at an angle of 90 degrees. A transducer 144 is mounted on the process flow block 16 in the manner previously described to monitor the pressure of the carbon dioxide flowing into the process flow block 16 from the supply tank 28.

After the carbon dioxide exits the process flow block 16 it flows to a $CO_2$ regulator valve 146 via a tube 148, which is mounted to the process flow block 16 via a press-fitted coupling 143 and coupled to the $CO_2$ regulator valve via a coupling 145. The $CO_2$ regulator valve 146 can be manually adjusted and is provided to adjust the pressure of the carbon dioxide which is supplied to the mixing chambers 18 and 20. The pressure of the carbon dioxide flowing into the process flow block 16 from the carbon dioxide supply tank is approximately 60–70 psi. The pressure of the carbon dioxide being supplied to the mixing chambers 18 and 20 should be approximately 30–40 psi for normal overrun and product consistency. The $CO_2$ regulator valve 146 is used to regulate this pressure. A control knob 147 on the $CO_2$ regulator 146 is used to adjust the pressure. A gauge 149 is provided for displaying the pressure of the carbon dioxide exiting the $CO_2$ regulator valve 146.

The reduced pressure carbon dioxide exits the $CO_2$ regulator valve 146 via two separate paths both of which deliver the carbon dioxide back to the process flow block 16. Path No. 1 delivers the carbon dioxide to the left side of the process flow block 16 via a copper tube 150, which is coupled to the process flow block and the $CO_2$ regulator valve 146 via couplings 151A and 152, respectively. Path No. 2 delivers the carbon dioxide to the right side of the process flow block 16 via a copper tube 153, which is coupled to the process flow block and the $CO_2$ regulator valve 146 via couplings 151B and 154, respectively. The reduced carbon dioxide exits the process flow block 16 via a pair of outlets, which are disposed on the adjacent face of the flow block at an angle of 90 degrees.

A transducer 156 is mounted on the right side of the process flow block 16 in the flow path through which the carbon dioxide traveling along Path No. 2 flows. The transducer 156 is mounted in the manner previously described and monitors the pressure of the carbon dioxide flowing into the mixing chambers 18 and 20. Since the pressure of the reduced pressure carbon dioxide is the same along both Path No. 1 and Path No. 2, only one transducer is needed. As those of ordinary skill in the art will appreciate, the transducer 156 could alternatively be mounted on the left side of the process flow block 16 in flow Path No. 1.

A pair of solenoids 157 and 158 are mounted at the exit ports of the process flow block 16 where the low pressure carbon dioxide exits the process flow block. The solenoids 157 and 158 control the supply of the reduced pressure carbon dioxide into the mixing chambers 18 and 20, respectively. As will be further explained below the control circuit 14 controls the activation of the solenoids 157 and 158. A check valve 155 is coupled to the solenoid 157 via a tube 159. A hose 160 is in turn coupled to the check valve 155 and delivers the reduced pressure carbon dioxide from the left side of the process flow block 16 into the mixing chamber 18. Similarly, a check valve 161 is coupled to the solenoid 158 via a tube 162. A hose 163 is in turn coupled to the check valve 161 and delivers the reduced pressure carbon dioxide from the right side of the process flow block 16 into the mixing chamber 20.

More precisely, the hose 160 connects with the hose 132, which delivers the combined syrup No.1/water mixture to the mixing chamber 18, at a "T" connector 164. The syrup No. 1/water mixture combines with the reduced pressure carbon dioxide at the "T" connector 164 so that the combined syrup No. 1/water/reduced pressure carbon dioxide mixture is delivered to the mixing chamber 18 via hose 166, as shown in FIG. 2. The "T" connector 164 therefore joins the hoses 132, 160, and 166 together. The hose 166 is coupled to an expansion chamber 168 (shown in FIG. 1) which accumulates excess product when the pressure in the mixing chamber 18 rises above a certain point. The expansion chamber 168 operates to moderate the pressure in the mixing chamber 18 so that it does not get too high. A hose 170 delivers the mixture from the expansion chamber 168 into the mixing chamber 18. The couplings of the hoses 166 and 170 to the expansion chamber 168 and the mixing chamber 18 are well known in the art.

Similarly, the hose 163 connects with the hose 134, which delivers the combined syrup No. 2/water mixture to the mixing chamber 20, at a "T" connector 172, as shown in FIG. 2. The syrup No. 2/water mixture combines with the reduced pressure carbon dioxide at the "T" connector 172 so that the combined syrup No. 2/water/reduced pressure carbon dioxide mixture is delivered to the mixing chamber 20 via hose 174. The "T" connector therefore joins the hoses 134, 163, and 174 together. The hose 174 is coupled to an expansion chamber 176 (shown in FIG. 1) which is identical to expansion chamber 168. A hose 178 delivers the mixture from the expansion chamber 176 to the mixing chamber 20. The couplings of the hoses 174 and 178 to the expansion chamber 176 and the mixing chamber 20 are well known in the art.

The preferred materials and components are also follows: All the tubes are made of a stainless steel, except tubes 148, 150 and 153 which are made of copper. The process flow block 16 and the secondary flow blocks 100 and 102 are formed of a plastic material, preferably Delrin®. The pressure transducers are preferably Motorola part No. MPX2700D; the solenoids are preferably selected from the following: ALCO part No. 204CD 1/4S 5/32-AMS 24/50-60, or Sirai Electromeccanica S.R.L. part Nos. L171-B13-Z 723A-24 VAC/60 and PL171-B13Z723A-24VAC/60. The $CO_2$ regulator valve 146 is preferably a Wilkerson part No. R0401N00. All press-fitted couplings are preferably ¼" stainless steel fittings manufactured by Chudnow Manufacturing. All hoses are preferably ¼" vinyl tubing with stainless steel braid coating (part No. AV4) manufactured by Chudnow Manufacturing. The brix valves are preferably part No. 310-198-133 manufactured by the Cornelius company. The check valves are preferably ¼" stainless steel ball check valves (part No. S470-44) manufactured by Chudnow Manufacturing.

Figure 5:
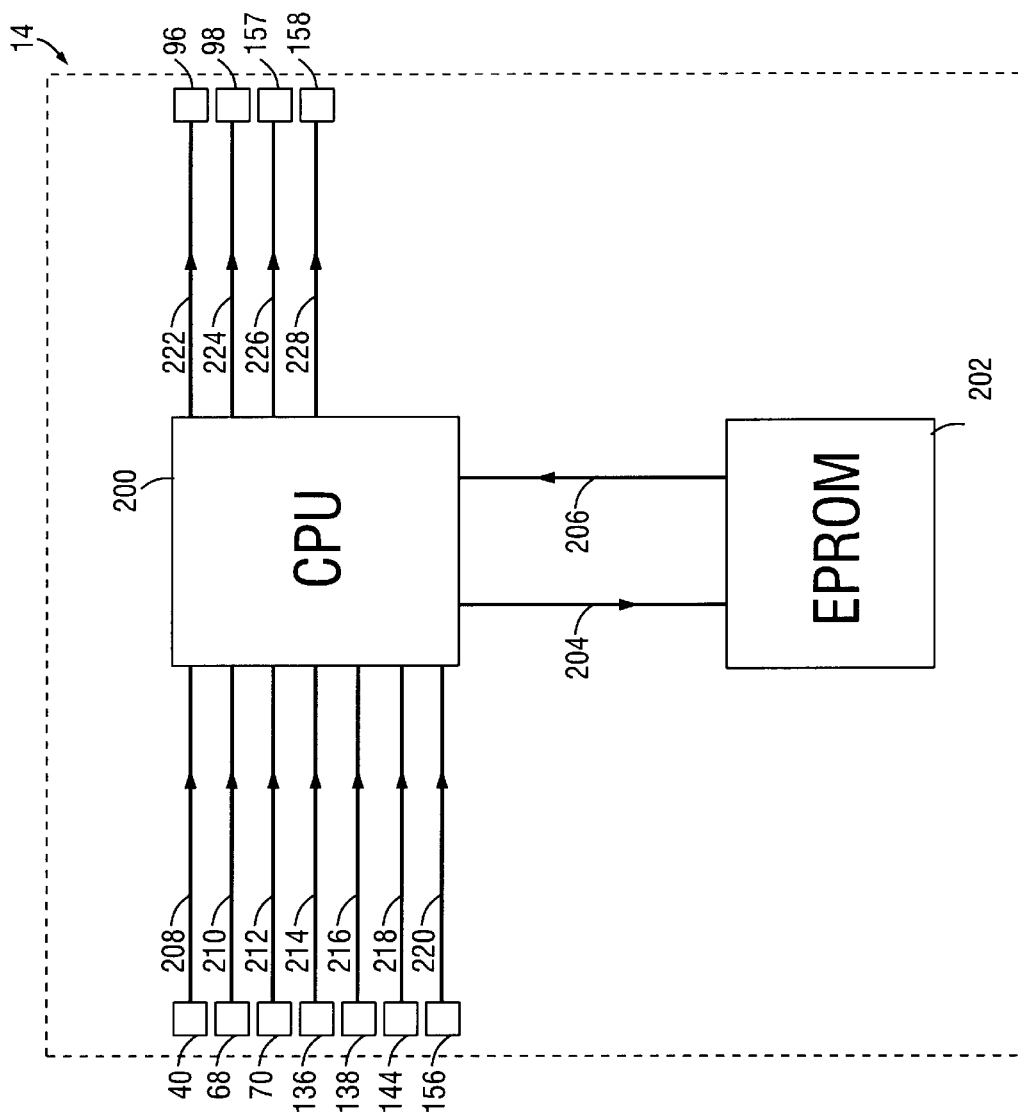
FIG. 5 is a schematic diagram of a control circuit that controls the flow of ingredients into the mixing chambers.

At the heart of the process control is the control circuit 14. A detailed schematic drawing of the control circuit 14 is shown in FIG. 5. The control circuit 14 includes a CPU (central processing unit) 200, an EPROM (Erasable Programmable Read Only Memory) 202, and a series of inputs and outputs. The CPU 200 and the EPROM 202 are connected to one another via communication lines 204 and 206. The CPU 200 is preferably Motorola part No. 68HC811 and the EPROM is preferably SGS Thompson part No. M27/C512. The inputs into the CPU 200 include pressure readings from the transducers 40, 68, 70, 136, 138, 144 and 156 and the outputs include control signals to the solenoids 96, 98, 157 and 158. The pressure transducers 40, 68, 70, 136, 138, 144, and 156 are connected to the CPU 200 via communication lines 208, 210, 212, 214, 216, 218, and 220, respectively. The solenoids 96, 98, 157, and 158 are connected to the CPU 200 via communication lines 222, 224, 226, and 228, respectively. The CPU 200 receives numerous of other inputs including motor loads and temperature readings and transmits numerous other output signals including compressor on/off instructions, condenser on/off instructions, and mixing motor on/off instructions, none of which are directly relevant to the present invention and therefore will not be discussed further herein.

A discussion of the operation of the frozen carbonated beverage machine 10 according to the present invention follows. This discussion focuses on how the invention is implemented with respect to the mixing chamber 18. As those of ordinary skill in the art will appreciate the same process can be applied to the mixing chamber 20.

First, an operator sets the pressure at which carbon dioxide is to be injected into the mixing chamber 18. This is done by adjusting the control knob 147 to the desired pressure. Then, the transducer 144 senses the pressure of carbon dioxide been supplied to the mixing chamber 18 and communicates this value to the CPU 200, via communication line 218, as shown in FIG. 5. Next, the CPU 200 employs an algorithm stored in the EPROM 202 to determine the low and high set point pressure values based upon the pressure of carbon dioxide being supplied to the mixing chamber 18. The algorithm is programmed to set the low and high set point values at some offset value below the pressure of carbon dioxide being injected into the mixing chamber 18.

Figure 6:
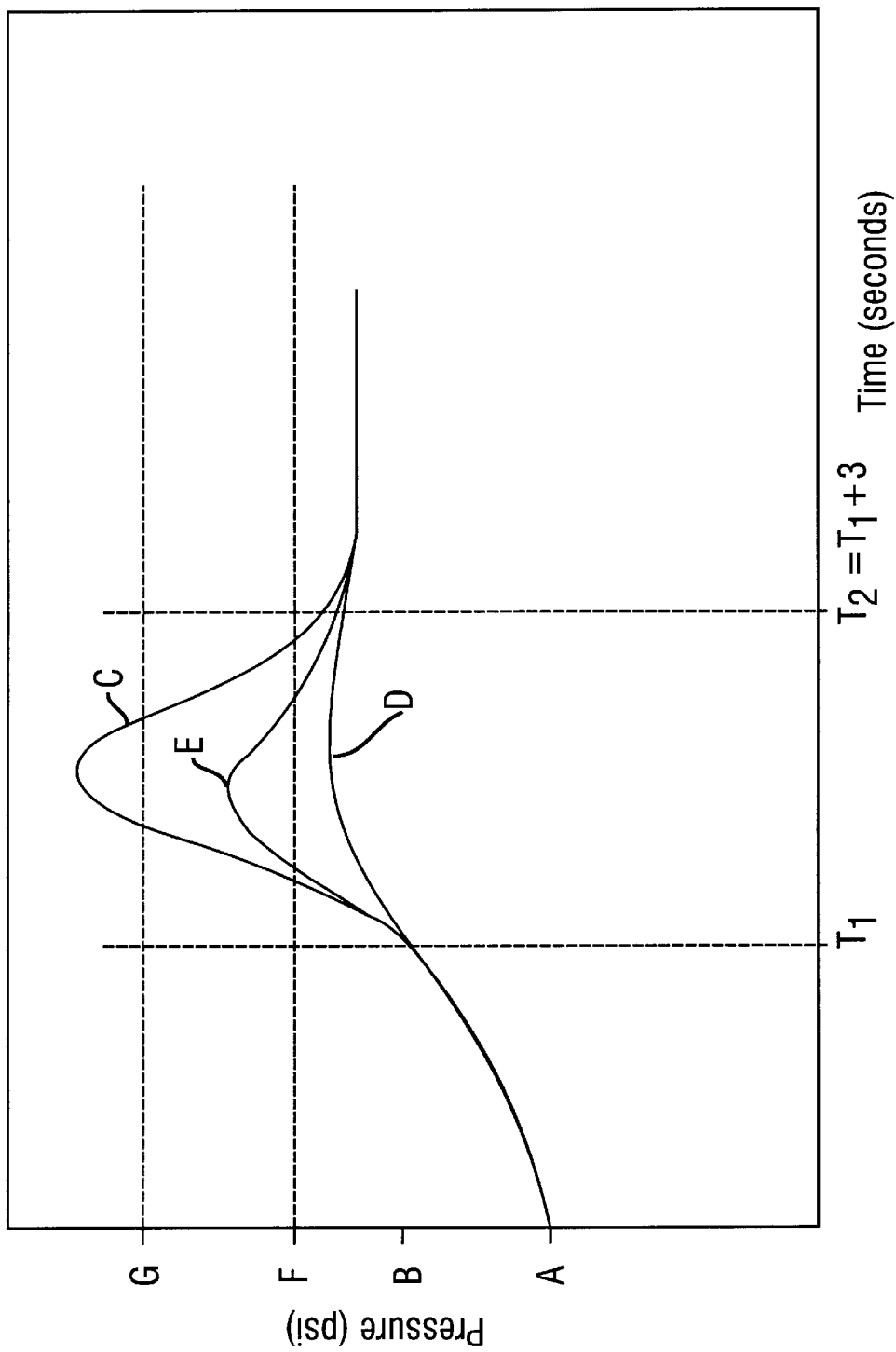
FIG. 6 is a graph of the variation of pressure in the mixing chamber as a function of time immediately before, during, and immediately after, a fill cycle.

For example, if the pressure of carbon dioxide being injected into the mixing chamber 18 is 30 psi, offset values of 3 and 5 psi may be selected. In this case, the low set point pressure value would be 25 psi and the high set point pressure value would be 27 psi. Thus, the CPU 200 would instruct one or both of the solenoid valves 96 and 157, via communication lines 222 and 226, to open when the pressure in the mixing chamber 18 was 25 psi and to close or partially close when the pressure in the mixing chamber 18 reached 27 psi. This is indicated in FIG. 6 by the points A and B. Point A represents the low set point pressure value and point B represents the high set point pressure value. The CPU 200 monitors the pressure in the mixing chamber 18 by taking readings from the transducer 136.

The initial offset values may be set at any number of values. For example, they may be set at 1 and 3 psi, 2 and 4 psi, 3 and 5 psi, 4 and 6 psi, or 5 and 7 psi in which case the initial low and high set point pressure values would be 27 and 29 psi, 26 and 28 psi, 25 and 27 psi, or 24 and 26 psi, 23 and 25 psi, respectively. If a high gas to liquid ratio is desired, then the offset values should be relatively large, e.g., 4 and 6 psi or 5 and 7 psi. Correspondingly, if a low gas to liquid ratio is desired, then the offset values should be relatively small, e.g., 1 and 3 psi or 2 and 4 psi. As those of ordinary skill in the art will appreciate, other offset values may be used.

The problem with prior art devices is that sometimes the gas to liquid ratio set by the operator is not maintained, thus causing the consistency and quality of the beverage product to be negatively affected. This can occur for a number of reasons including, e.g., dispensing too much gas by having the dispensing valve opened too wide, or for some reason the pressure measurements in the mixing chamber are not consistent. The only way to correct this problem in prior art devices is to manually change the operating pressure or manually fill or empty the mixing chamber. Also, if the liquid is drawn off when the mixing chamber is not frozen then the gas to liquid ratio is "unbalanced" and it must be manually corrected.

The present invention solves this problem by monitoring the level of liquid in the mixing chamber and changing the operating pressure settings or offsets to raise or lower the gas to liquid ratio as conditions change. This is accomplished using the CPU 200 as follows. After the carbon dioxide pressure is set using the control knob 147 and the low and high set point pressure values have been set, the frozen carbonated beverage machine 10 is filled and ready for operation. After a draw cycle, i.e., after frozen product is dispensed, the pressure in the chamber typically will drop. When this occurs the CPU 200 instructs the solenoid valves 96 and 157 to open and thereby inject the carbon dioxide and liquid mixture into the mixing chamber 18. This initiates what is known as a fill cycle. The solenoid valves 96 and 157 are instructed to open when the pressure in the mixing chamber 18 falls below the low set point pressure value. They remain open until the pressure in the mixing chamber 18, as sensed by the pressure transducer 136, reaches the high set point pressure value. At this point, the CPU 200 instructs the solenoid valves 96 and 157 to close or partially close. When this occurs, the fill cycle is completed.

Immediately before, during and after a fill cycle, the CPU 200 monitors the pressure in the mixing chamber 18. Typically, within three seconds after a fill cycle is completed the pressure in the mixing chamber 18 will spike. This is illustrated in the graph shown in FIG. 6. If the spike is too great, then that indicates that the gas to liquid ratio is too low and must be adjusted. This is illustrated by the curve C shown in FIG. 6. This is done by increasing the offset values. In this example, the CPU 200 employing the algorithm would change the offset values from 3 and 5 psi to 4 and 6 psi, respectively. The low and high set point pressures would thereby be changed from 25 and 27 psi to 24 and 26 psi, respectively. If, after the next fill cycle is completed, the spike is again too great, then the algorithm will again raise the offsets values. This step is repeated until the pressure spike is within an acceptable range.

Likewise, if the spike is too small, then the gas to liquid ratio is too high and it must also be adjusted. This is illustrated by the curve D shown in FIG. 6. This is accomplished by decreasing the offset values. In this example, the offset values would be changed from 3 and 5 psi to 2 and 4 psi, respectively, which would have the effect of changing the low set point pressure values from 25 and 27 psi to 26 and 28 psi, respectively. This step is repeated until the spike is within an acceptable range. The curve E shown in FIG. 6 shows a pressure in the mixing chamber 18 that is within the acceptable range which is indicated by the minimum and maximum spike limits F and G, which are in this example preferably 30 and 34 psi, respectively. The acceptable range then in this example is preferably between 3 and 7 psi, i.e., the pressure in the mixing chamber 18 will preferably increase between 3 and 7 psi after the supply of ingredients to the mixing chamber is reduced or shut off.

By monitoring the pressure spikes that occur immediately following a fill cycle, the CPU 200 is able to monitor the amount of liquid in the mixing chamber 18. And by changing the set point pressure values when the pressure spikes are outside of the acceptable range, the CPU 200 can control the gas to liquid ratio, and thereby control the amount of liquid in the mixing chamber. As discussed above, the ability to control the amount of liquid in the mixing chamber enables the present invention to accurately control the consistency and quality of the frozen carbonated beverage product.

It should be understood that this principle applies regardless what pressure the $CO_2$ regulator 146 is adjusted to. As discussed above, the control knob 147 adjusts the pressure of carbon dioxide being supplied to the mixing chambers 18. Although the pressure is preferably set between 30 and 40 psi, the control knob 147 can be adjusted to set the pressure anywhere between 0 and 70 psi. As those of ordinary skill in the art will appreciate, no matter what pressure carbon dioxide is supplied at to the mixing chamber 18, appropriate offset values and a corresponding predetermined range can be chosen in accordance with the present invention so as to monitor and control the amount of liquid in the mixing chamber 18.

The present invention can alternatively monitor the amount of liquid in the mixing chamber 18 by monitoring the change in pressure that occurs in the mixing chamber 18 during a draw cycle. This is accomplished as follows. The CPU 200 continually tracks the pressure in the mixing chamber 18 during the draw cycle. If, during the draw cycle, or at the end of the draw cycle, the pressure suddenly falls, then the CPU 200 knows that the amount of liquid in the chamber has changed. If the pressure in the mixing chamber 18 falls sharply during, or immediately following, a draw cycle, then that indicates that there is too much liquid in the mixing chamber 18 and not enough gas. This situation is represented by the curve A shown in FIG. 7. In this case, the CPU 200, employing the algorithm according to the present invention, changes the offset values to increase the gas to liquid ratio. If the pressure in the mixing chamber 18 remains relatively unchanged during, or immediately following, a draw cycle, then that indicates that there is too much gas in the chamber and not enough liquid. This situation is represented by the curve B shown in FIG. 7 In this case, the CPU 200 changes the offset values to decrease the gas to liquid ratio. The curve C shows a gradual decrease in the pressure in the mixing chamber 18 during a draw cycle. In this case, the CPU 200 would not adjust the offset values.

Figure 7:
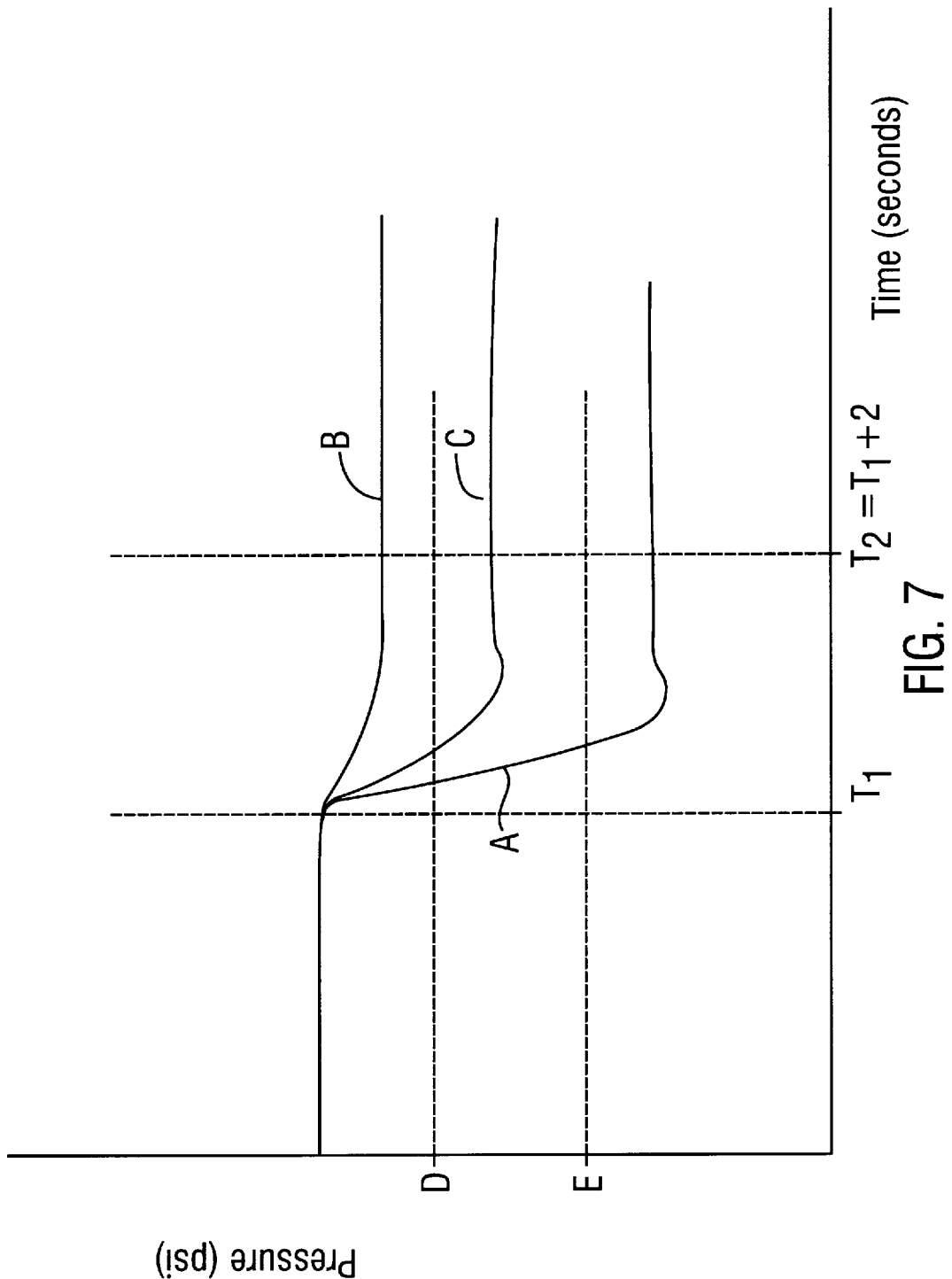
FIG. 7 is a graph of the variation of pressure in the mixing chamber as a function of time immediately before, during, and immediately after, a draw cycle.
Figure 8A:
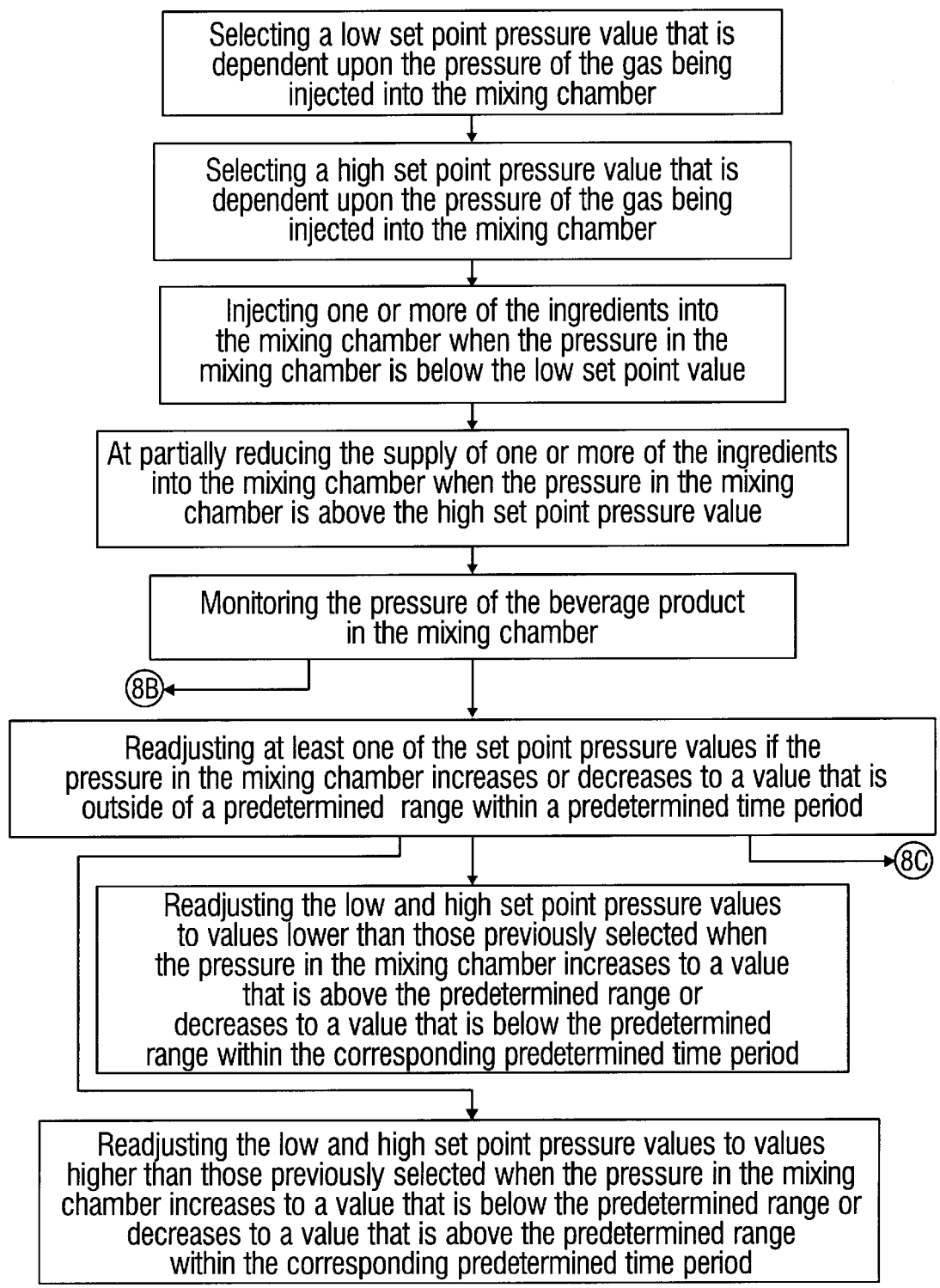
FIG. 8 is a flow chart illustrating the steps in a method of monitoring and controlling the amount of liquid in a mixing chamber according to the present invention.
Figure 8B:
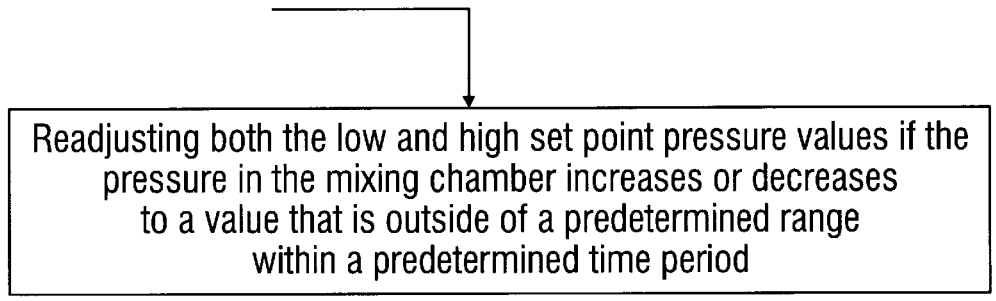
Figure 8C:
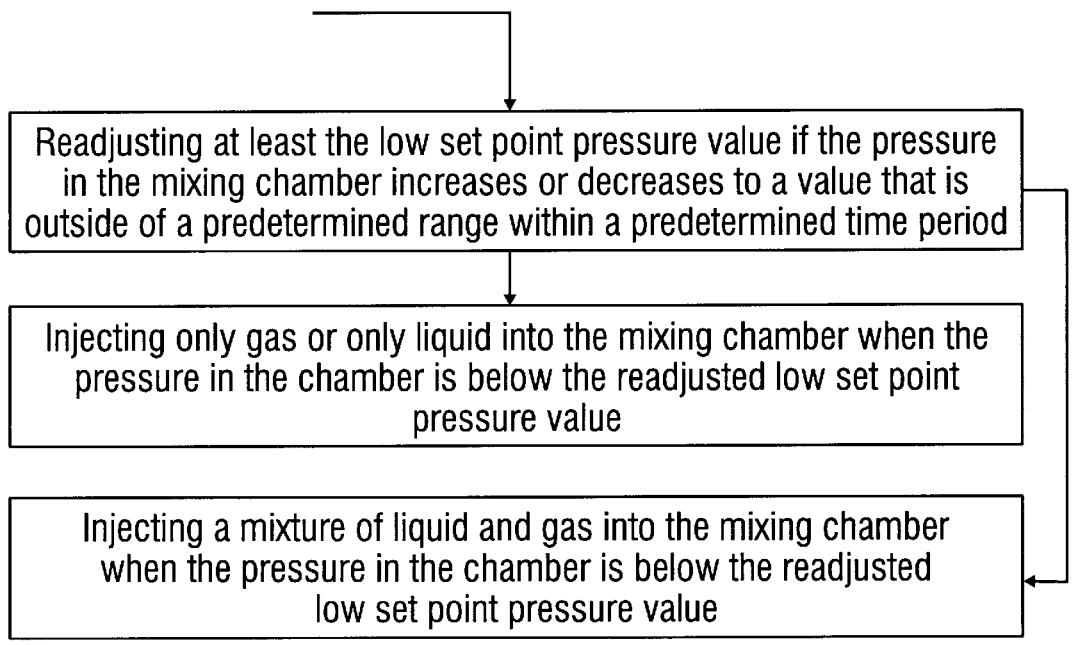

The minimum and maximum negative spike limits are shown in FIG. 7 at points D and E, respectively. When the low and high set point pressure values are 25 and 27 psi, respectively, the pressure in the mixing chamber preferably falls between 2 and 10 psi, respectively. Thus, in this case the difference between points D and E is approximately 8 psi. As discussed above, by changing the offset values, and hence the low and high set point pressure values, the gas to liquid ratio can be adjusted and thus the amount of liquid in the mixing chamber. The sequence of steps executed by the CPU 200 in carrying out this method of monitoring and controlling the amount of liquid in the mixing chamber 18 is shown in FIG. 8.

The present description discusses changing the offset values when the pressure in the mixing chamber 18 suddenly changes during or after either a fill cycle or a draw cycle. While currently these are the preferred periods when the pressure in the mixing chamber 18 should be monitored, as those of ordinary skill in the art will appreciate, the CPU 200 can be programmed to change the offset values whenever there are sudden pressure changes in the mixing chamber. The present invention is intended to encompass such other instances.

Figure 9:
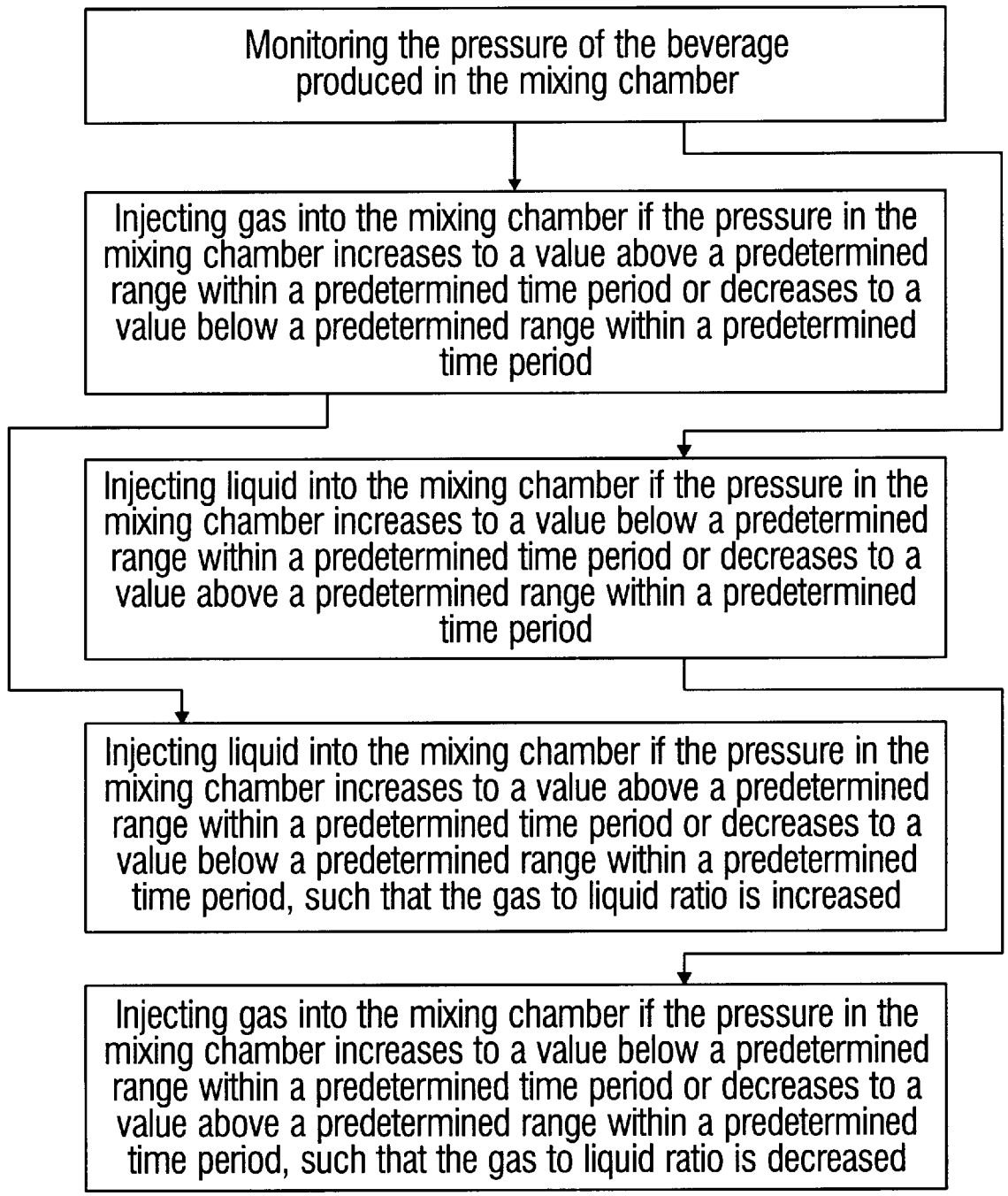
FIG. 9 is a flow chart illustrating the steps in an alternate method of monitoring and controlling the amount of liquid in a mixing chamber according to the present invention.

The present invention can alternatively control the amount of liquid in the mixing chamber 18 without changing the set point pressure values. This can be accomplished simply by injecting more (or less) gas or liquid into the mixing chamber when the level of liquid in the chamber is too high or too low. In this alternate embodiment, the CPU 200 would operate to increase the supply of gas to the mixing chamber 18 when there is too much liquid in the chamber and to increase the supply of liquid to the chamber when there is not enough liquid. When there is too much liquid in the mixing chamber 18, the CPU 200 would instruct the solenoid 157 to fully open. The CPU 200 may also instruct the solenoid 96 to partially open in this situation. The solenoids 96 and 157 would be preferably controlled to increase the ratio of gas to liquid being injected into the chamber in this situation. When there is not enough liquid in the mixing chamber 18, the CPU 200 would instruct the solenoid 96 to fully open. The CPU 200 may also instruct the solenoid 157 to partially open in this situation. The solenoids 96 and 157 would be preferably controlled to increase the ratio of liquid to gas being injected into the chamber in this situation. The sequence of steps executed by the CPU 200 in carrying out this alternate method of monitoring and controlling the amount of liquid in the mixing chamber 18 is shown in FIG. 9.

The amount of liquid or gas that should be added to the mixing chamber 18 using this alternate method depends upon the liquid level in the chamber to begin with. This can be determined by measuring pressure spikes in the mixing chamber 18 as discussed above. Empirical studies can be performed to determine how much gas or liquid should be injected into the mixing chamber 18 when the pressure spike has a given magnitude, either positive or negative. A program can be written to define this relationship, which would then preferably be stored in the EPROM 202 and implemented by the CPU 200.

As those of ordinary skill in the art will appreciate, the present invention may take many forms and embodiments. Some embodiments have been described so as to give an understanding of the invention. For example, as explained above, the present invention is not limited to frozen carbonated beverage machines. The present invention has application in the production of other beverage products. Furthermore, in applications involving gas saturated products, other gases besides carbon dioxide may be used, including but not limited to, air, phosphates, and nitrogen. It is intended that the disclosed embodiments should be illustrative, and not limiting of the present invention. Rather, it is intended that the invention cover all modifications, equivalents and alternatives falling within the spirit and scope of the invention as defined by the appended claims.

What is claimed is:

1. A method for controlling the consistency and quality of a beverage product made by mixing several ingredients including a liquid and a gas in a mixing chamber, comprising the steps of:

selecting a low set point pressure value that is dependent upon the pressure of the gas being injected into the mixing chamber;

selecting a high set point pressure value that is dependent upon the pressure of the gas being injected into the mixing chamber;

injecting one or more of the ingredients into the mixing chamber when the pressure in the mixing chamber is below the low set point value;

at least partially reducing the supply of one or more of the ingredients into the mixing chamber when the pressure in the mixing chamber is above the high set point pressure value;

monitoring the pressure of the beverage product in the mixing chamber; and readjusting at least one of the set point pressure values if the pressure in the mixing chamber increases or decreases to a value that is outside of a predetermined range within a predetermined time period.

2. The method for controlling the consistency and quality of a beverage product according to claim 1, wherein the predetermined range is different for measured increases in chamber pressure than it is for measured decreases in chamber pressure and wherein the predetermined time period is different for measured increases in pressure than it is for measured decreases in pressure.

3. The method for controlling the consistency and quality of a beverage product according to claim 1, wherein both the low and high set point pressure values are readjusted to values lower than those previously selected when the pressure in the mixing chamber increases to a value that is above the predetermined range or decreases to a value that is below the predetermined range within the corresponding predetermined time period.

4. The method for controlling the consistency and quality of a beverage product according to claim 1, wherein both the low and high set point pressure values are readjusted to values higher than those previously selected when the pressure in the mixing chamber increases to a value that is below the predetermined range or decreases to a value that is above the predetermined range within the corresponding predetermined time period.

5. The method for controlling the consistency and quality of a beverage product according to claim 1, wherein the predetermined range is approximately between 30 and 34 psi for pressure increases.

6. The method for controlling the consistency and quality of a beverage product according to claim 1, wherein the predetermined time period is approximately between 0 and 3 seconds for pressure increases.

7. The method for controlling the consistency and quality of a beverage product according to claim 1, wherein the difference between the low set point pressure value and the high set point pressure value is approximately 2 psi.

8. The method for controlling the consistency and quality of a beverage product according to claim 1, wherein both the low and high set point pressure values are readjusted if the pressure in the mixing chamber increases or decreases to a value that is outside of a predetermined range within a predetermined time period.

9. The method for controlling the consistency and quality of a beverage product according to claim 1, wherein at least the low set point pressure value is readjusted.

10. The method for controlling the consistency and quality of a beverage product according to claim 9, further comprising the step of injecting only gas or only liquid into the mixing chamber when the pressure in the chamber is below the readjusted low set point pressure value.

11. The method for controlling the consistency and quality of a beverage product according to claim 9, further comprising the step of injecting a mixture of liquid and gas into the mixing chamber when the pressure in the chamber is below the readjusted low set point pressure value.

12. An apparatus for controlling the consistency and quality of a beverage product made by mixing several ingredients including a liquid and a gas in a mixing chamber, said apparatus comprising:

a transducer that measures the pressure in the mixing chamber;

a programmable memory device employing an algorithm that selects a low set point pressure value that is dependent upon the pressure of gas being injected into the mixing chamber and a high set point pressure value that is also dependent upon the pressure of gas being injected into the mixing chamber;

at least one valve that opens to inject one or more of the ingredients into the mixing chamber when the pressure in the mixing chamber is below the low set point pressure value and that at least partially closes to limit the supply of the one or more ingredients to the mixing chamber when the pressure in the mixing chamber is above the high set point pressure value; and a processor that receives inputs from the transducer, the programmable memory device and at least one control valve, said processor being operative to:

(a) monitor the pressure in the mixing chamber; and (b) readjust at least one of the set point pressure values if the pressure in the mixing chamber increases or decreases to a value that is outside of a predetermined range within a predetermined time period.

13. The apparatus for controlling the consistency and quality of a beverage product according to claim 12, wherein the processor is further operative to readjust both the low and high set point pressure values to values lower than those previously selected when the pressure in the mixing chamber increases to a value that is above the predetermined range or decreases to a value that is below the predetermined range within the corresponding predetermined time period.

14. The apparatus for controlling the consistency and quality of a beverage product according to claim 12, wherein the processor is further operative to readjust both the low and high set point pressure values to values higher than those previously selected when the pressure in the mixing chamber increases to a value that is below the predetermined range or decreases to a value that is above the predetermined range within the corresponding predetermined time period.

15. The apparatus for controlling the consistency and quality of a frozen carbonated beverage product according to claim 12, wherein the processor is operative to readjust at least the low set point pressure value.

16. The apparatus for controlling the consistency and quality of a beverage product according to claim 15, wherein the processor is further operative to inject only the liquid or only the gas into the mixing chamber when the pressure in the chamber is below the readjusted low set point pressure value.

17. The apparatus for controlling the consistency and quality of a frozen carbonated beverage product according to claim 15, wherein the processor is operative to inject a mixture of the liquid and gas into the mixing chamber when the pressure in the chamber is below the readjusted low set point pressure value.

18. A method for controlling the consistency and quality of a beverage product made by mixing one or more ingredients in a mixing chamber, comprising the steps of:

selecting a low set point pressure value and a high set point pressure value;

injecting at least one of the one or more ingredients into the mixing chamber when the pressure in the mixing chamber is below the low set point value;

at least partially reducing the supply of the at least one ingredient into the mixing chamber when the pressure in the mixing chamber is above the high set point pressure value;

monitoring the pressure of the beverage product in the mixing chamber; and readjusting at least one of the set point pressure values if the pressure in the mixing chamber increases or decreases to a value that is outside of a predetermined range within a predetermined time period.

19. An apparatus for controlling the consistency and quality of a beverage product made by mixing one or more ingredients in a mixing chamber, comprising:

a transducer that measures the pressure of the beverage product in the mixing chamber;

a programmable memory device employing an algorithm that selects a low set point pressure value and a high set point pressure value;

at least one valve that opens to inject at least one of the one or more of the ingredients into the mixing chamber when the pressure in the mixing chamber is below the low set point pressure value and that at least partially closes to limit the supply of the at least one ingredient into the mixing chamber when the pressure in the mixing chamber is above the high set point pressure value; and a processor that receives inputs from the transducer, the programmable memory device and the at least one control valve, said processor being operative to:

(a) monitor the pressure in the mixing chamber; and (b) readjust at least one of the set point pressure values if the pressure in the mixing chamber increases or decreases to a value that is outside of a predetermined range within a predetermined time period.

20. A method for controlling the consistency and quality of a beverage product made by mixing several ingredients including a liquid and a gas in a mixing chamber, comprising the steps of:

monitoring the pressure of the beverage product in the mixing chamber;

injecting gas into the mixing chamber if the pressure in the mixing chamber increases to a value above a predetermined range within a predetermined time period or decreases to a value below a predetermined range within a predetermined time period; and injecting liquid into the mixing chamber if the pressure in the mixing chamber increases to a value below a predetermined range within a predetermined time period or decreases to a value above a predetermined range within a predetermined time period.

21. The method for controlling the consistency and quality of a beverage product according to claim 20, further comprising the step of injecting liquid into the mixing chamber if the pressure in the mixing chamber increases to a value above a predetermined range within a predetermined time period or decreases to a value below a predetermined range within a predetermined time period, so that the gas to liquid ratio is increased.

22. The method for controlling the consistency and quality of a beverage product according to claim 20, further comprising the step of injecting gas into the mixing chamber if the pressure in the mixing chamber increases to a value below a predetermined range within a predetermined time period or decreases to a value above a predetermined range within a predetermined time period, so that the gas to liquid ratio is decreased.

23. An apparatus for controlling the consistency and quality of a beverage product made by mixing several ingredients including a liquid and a gas in a mixing chamber, comprising:

a transducer that measures the pressure in the mixing chamber;

a programmable memory device employing a control algorithm;

at least one valve that operates to inject one or more of the ingredients into the mixing chamber; and a processor that receives inputs from the transducer, the programmable memory device and the at least one valve, said processor being operative to:

(a) monitor the pressure in the mixing chamber;

(b) determine if the pressure in the mixing chamber increases to a value above a predetermined range within a predetermined time period or decreases to a value below a predetermined range within a predetermined time period employing the control algorithm;

(c) instruct the at least one valve to inject gas into the mixing chamber if the pressure in the mixing chamber increases to a value above a predetermined range within a predetermined time period or decreases to a value below a predetermined range within a predetermined time period;

(d) determine if the pressure in the mixing chamber increases to a value below a predetermined range within a predetermined time period or decreases to a value above a predetermined range within a predetermined time period employing the control algorithm; and (e) instruct the at least one valve to inject liquid into the mixing chamber if the pressure in the mixing chamber increases to a value below a predetermined range within a predetermined time period or decreases to a value above a predetermined range within a predetermined time period.

24. The apparatus for controlling the consistency and quality of a beverage product according to claim 23, wherein the processor is further operative to instruct the at least one valve to inject liquid into the mixing chamber if the pressure in the mixing chamber increases to a value above a predetermined range within a predetermined time period or decreases to a value below a predetermined range within a predetermined time period, wherein the amount of liquid being injected into the mixing chamber under this condition is less than the amount of gas being injected.

25. The apparatus for controlling the consistency and quality of a beverage product according to claim 23, wherein the processor is further operative to instruct the at least one valve to inject gas into the mixing chamber if the pressure in the mixing chamber increases to a value below a predetermined range within a predetermined time period or decreases to a value above a predetermined range within a predetermined time period, wherein the amount of gas being injected into the mixing chamber under this condition is less than the amount of liquid being injected.

* * * * *